United States Patent [19]
Hirose

[11] Patent Number: 4,753,523
[45] Date of Patent: Jun. 28, 1988

[54] LOW MAGNIFICATION PROJECTION OBJECTIVE LENS

[75] Inventor: Hideo Hirose, Kawaguchi, Japan

[73] Assignee: Nippon Kogaku K. K., Tokyo, Japan

[21] Appl. No.: 898,097

[22] Filed: Aug. 20, 1986

[30] Foreign Application Priority Data

Aug. 29, 1985 [JP] Japan ................... 60-190257

[51] Int. Cl.$^4$ ............ G02B 27/18; G02B 13/22; G02B 11/16
[52] U.S. Cl. .................................. 350/471
[58] Field of Search ............ 350/471, 415, 445, 476

[56] References Cited

FOREIGN PATENT DOCUMENTS 204816 11/1984 Japan .

Primary Examiner—John K. Corbin
Assistant Examiner—Rebecca D. Gass
Attorney, Agent, or Firm—Shapiro and Shapiro

[57] ABSTRACT

A low magnification projection objective lens for use in projection examination instrument. The projection objective lens comprises three lens units. The first unit is a converging lens unit composed of a positive lens component on the image side and a negative lens component on the object side, the second unit is a diverging lens unit composed of a negative lens component on the image side and a positive lens component on the object side and the third unit is a converging lens unit composed of a positive lens component.

8 Claims, 2 Drawing Sheets

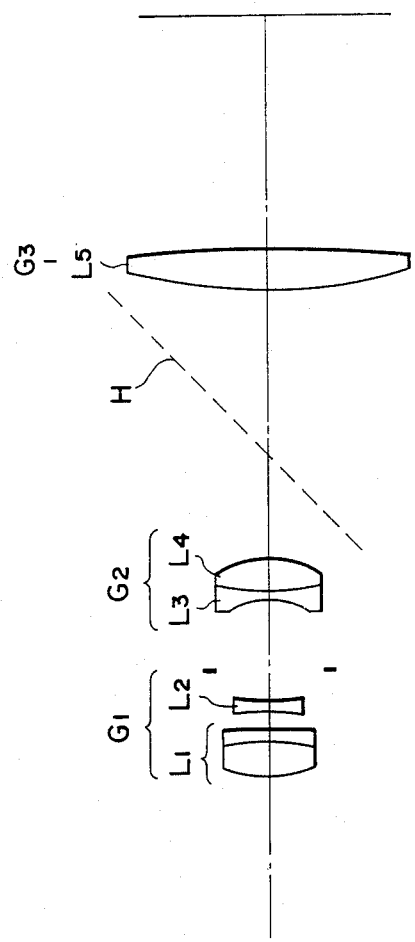

LOW MAGNIFICATION PROJECTION OBJECTIVE LENS

BACKGROUND OF THE INVENTION

1. Field of the Invention

The present invention relates to a projection lens suitable for the projection examination of an object. More particularly, the present invention relates to a projection objective lens of wide field angle and low magnification which gives an accurately enlarged image of an object to be examined.

2. Related Background Art

For the project examination instrument, it is generally required to form an accurately enlarged image of an object on a screen. It is also essential for the projection examination instrument to exclude measurement error attributable to accidental error such as focusing error as completely as possible.

In view of the above points, the projection object lens should be formed as a telecentric optical system and the distortion of the lens should be corrected sufficiently. Of course, like other lenses such as microscope objective, the projection lens should be corrected well also regarding other aberrations.

The above requirements are generally applicable to all of projection objective lenses. However, when man tries to make a projection lens of low magnification such as above five magnifications ($\times 5$) which can satisfy the requirements, he encounters the following difficult problems:

The first problem concerns the working distance of the lens (the distance from the object plane to the front end of the lens). In general, the working distance of an object lens is about a half of the focal length. Therefore, if this is applied to a low magnification projection objective lens having a long focal length, the working distance will be too long and the lens size (the distance from the object plane to the rear end of the lens) will be extraordinarily large. The objective lens for use in projection examination apparatus is desired to be small in size and compact. To satisfy the requirements of sufficiently long working distance and small lens size at the same, the low magnification objective lens has usually been formed by employing the so-called tele-type (telephoto type) construction comprising a converging lens unit and a diverging lens arranged in this order from the image side.

In this case, however, it is impossible to form a telecentric optical system employing a mere basic tele-type construction in an objective lens. According to the prior art, a converging field lens unit is additionally disposed between the diverging lens unit and the object plane to form the telecentric optical system. An example of such construction of low magnification projection objective lens is disclosed in Japanese patent application laid open No. 204,816/1984.

Since the low magnification objective lens has a large field diameter, the load which the field lens unit has to bear for good correction of distortion is very large. For this reason, in the prior art low magnification projection objective lens as disclosed in the above-referred Patent Publication, Japanese patent applicaton laid open No. 204,816/1984, many lenses have been used in the field lens unit. Even by it there remains some aberration to be corrected. Acccording to the prior art, the tele-type converging and diverging lens units have been used to correct the remaining aberration. The refractive powers of these lens units have been rendered strong by it and the number of lenses needed has been increased. Because of it, the low magnification projection objective lens has a very complicated construction. For such complicated construction, the lens performance of it is still unsatisfactory.

Second problem relates to reflection illumination.

Projection lenses used in the art at present generally contain a half-mirror for guiding illumination light to the object to be examined. This built-in half mirror improves the easy operability of the projection system. Even in the case of the above-mentioned prior art tele-type lens construction, it is possible to incorporate a half-mirror into the projection lens when the refractive power is suitably distributed among the lens units. However, when a half-mirror is incorporated into the projection lens, flare is caused by it. In the case of reflection illumination, the object surface is illuminated through the above-mentioned field lens units of the projection lens. At the time, a flare is formed by the light reflected by the lens surface of the field lens unit. Since, as previously mentioned, the projection lens of low magnification, for example, that of five magnifications has a large field diameter, the lens has to have a large lens diameter in order to maintain the telecentricity at least on the object side.

As aberrations, in particular distortion must be corrected very well, it is unallowable to give a large curvature to the lens surface. Under the conditions, flare is easily formed.

The problem of flare is enhanced by the fact that the refractive power of the field lens unit necessary as the third lens unit must be fulfiled by many lenses each having a weak refractive power. The observation of the object is disturbed by the flare very much in particular when the object to be observed is an object of low reflectance. If the number of the lenses used in the field lens unit is decreased in order to reduce the flare, the share of aberration correction falling to the lens unit is rendered too large. It is no longer possible to correct distortion and other aberrations adequately.

Third problem concerns the manufacturing cost of the projection objective lens.

For the telecentric optical system it is required to use, as the object side lens, a lens whose diameter is larger than the object diameter at least. For example, in the case of an objective lens of five magnifications ($\times 5$) for a projection examination instrument having a screen diameter of 350 mm, the field diameter is 70 mm and, therefore, the lens needed is such a large lens whose diameter is 80 mm at least taking the aperture into account.

Since such a large lens is required, the total manufacturing cost of the projection objective lens is remarkedly increased up with increasing the number of lenses used in the above-mentioned field lens unit.

SUMMARY OF THE INVENTION

Accordingly, the primary object of the invention is to overcome the drawbacks involved in the prior art projection objective lens as described above and provide an improved projection objective lens.

More specifically, it is an object of the invention to provide a projection objective lens which has an improved performance of image formation with flare being minimized.

It is another object of the invention to provide a low magnificaton projection objective lens which enables to observe the surface and contour of an object be reflection illumination even when the object is of low reflectance.

It is a further object of the invention to provide a low magnification projection objective lens which is simple and compact in construction and in which the telecentricity is maintained at least on the object side.

Other objects, features and advantages of the present invention will appear more fully from reading the following description.

The projection objective lens according to the invention comprises, from the image side, a first converging lens unit G1 composed of a positive lens component and a negative lens component, a diverging second lens unit G2 composed of a negative lens component and a positive lens component and a converging third lens unit G3.

Generally, in the projection objective lens, the aberration to be primarily corrected is distortion. But, the thing as important as the correction of distortion is to obtain a high quality image throughout the screen. In other words, field curvature must be corrected well. To attain it, Petzval sum should sufficiently be reduced.

The embodiment of the projection lens disclosed in the aforementioned Japanese patent application laid open No. 204,816/1984 comprises lens units each composed of a plural number of thin lens components. In this construction of lens, Petzval sum must be corrected by suitably distributing the power among the units. To this end, it is required to strengthen the power of each of the lens units. This is one of the causes by which the correction of aberration has been made more difficult in the prior art lens.

According to the invention, the refractive power of each the lens group is weakened as much as possible. The Petzval sum increases up by it. In the lens according to the invention, the increased Petzval sum is corrected by the diverging second lens unit. To this end, the second lens unit is formed as a thick lens unit constituted of a negative lens component and a positive lens component on the object side of said negative component.

When the refractive power of each lens unit is weakened, there is produced a problem in addition to the above problem of Petzval sum. The problem is that the size of the lens is rendered too large in the direction along the optical axis. According to the invention, the problem has been solved by arranging the first and second lens units in the following manner:

Firstly, the converging first lens unit is constituted of at least one positive lens and at least one negative lens. The positive lens is disposed on the image side so that the principal plane of this lens unit is shifted a great distance toward the image side.

Secondly, the diverging second lens unit is constituted of one negative lens and one positive lens. The negative lens is disposed on the image side so that the principal plane of this lens unit is shifted a great distance toward the image side.

The above arrangement enables the first and second lens units to be disposed in the positions nearer to the object side than in the prior art and to decrease the actual lens size (the distance from the object plane to the apex of the image side lens surface of the most-image side lens component of the first lens unit). Thus, a compact construction for the small magnification projection objective lens has been realized.

As will be understood from the foregoing, the important feature of the invention by which the desired compact construction of projection lens has been realized is the inventive arrangement of positive lens and negative lens in the first and second lens units. The advantage of the invention can be obtained equally even when the positive and the negative lens components are cemented together or when a small air distance exists between them. The arrangement of the lens components according to the present invention has made it possible to weaken the refractive power of each the lens unit up to about a half of the refractive power needed by the prior art construction.

In the projection objective lens according to the present invention, the third lens unit basically functions as a field lens. Therefore, the spherical aberration and the chromatic aberration on axis must be corrected by the first and second lens units. This correction of aberrations can be achieved easily in the lens according to the invention. For example, a projection objective lens of low magnification in the order of about $\times 5$ has an effective aperture (F-number) of about F 8.5. Therefore, since the refractive power of each the lens unit could be weakened by the above feature of the invention, it is possible to adequately correct the spherical aberration by the contour of the lenses, that is, the bendings of the lenses of the first and second lens units. Also, as for the chromatic aberration on axis, it can be corrected easily by suitably selecting the glass materials for the respective lens components because the first and second lens units each comprise at least one positive lens and one negative lens. In addition to the correction of chromatic aberration on-axis, the magnification chromatic aberration must be corrected chiefly by the second and third lens units at the same time. This is also accomplished very easily in the lens according to the invention.

As seen from the optical path diagram in FIG. 1 of the accompanying drawings showing a first embodiment of the invention, a diaphragm is disposed near the first lens unit and the respective lens units have greatly different shares for on-axis chromatic aberration and magnification chromatic aberration. For this reason, in the projection objective lens according to the invention, the two different chromatic aberrations can be balanced very easily.

In the basic construct according to the present invention, the projection objective lens satisfies the following conditions:

$$0.45 < D_2/f_3 < 0.65 \quad (1)$$

$$0.5 < f_3/f < 0.8 \quad (2)$$

$$0.2 < |f_2|/f < 0.45 \quad (3)$$

wherein
  f is the focal length of the whole projection objective lens;
  $f_2$ is the focal length of the second lens unit G2;
  $f_3$ is the focal length of the third lens unit G3;
  $D_2$ is air distance between the second and third lens units.

As to the distance between the second and third lens units, it is desirable to set the distance as short as possible in view of the correction of aberrations generated in the third lens unit. The smaller the distance is, the larger height of incidence of the second lens is obtained, which is advantageous for the correction of aberrations generated in the third unit. However, in order to interpose a half-mirror H for reflection illumination obliquely between the second and third lens units, the above condition (1) must be satisfied. If man sets the distance between the second and third lens units to a value smaller than the lower limit of the condition (1), then it gives rise to difficulty in mounting the half-mirror. When the distance exceeds the upper limit of the condition, the height of incidence to the second lens unit is too small to maintain the balance for aberration correction between the second and third lens units.

As for the refractive power of the third lens unit, it is essential to satisfy the above conditon (2). When the refractive power is over the upper limit of the condition, the substantial diaphragm position is greatly shifted toward the image side of the lens and the aperture of the first lens unit is rendered large, which is disadvantageous for the correction of aberration.

If the lower limit of the condition (2) is exceeded, the focal length of the third lens unit is rendered short relative to the field diameter and the charge of aberration correction on the third lens unit is rendered too large. Further, since a certain minimum air distance is required between the second and third lens units to interpose the half-mirror H, the substantial diaphragm position is too close to the second lens unit. The height of incidence to the second lens unit is, therefore, too small to correct the aberrations generated in the third lens unit without difficulty. If man tries to sufficiently correct the aberrations by increasing the refractive power of the second lens unit, a large variation of aberration correction by the second lens unit will be caused by it. This is because the height of incidence of the object to the second unit from each ring band is variable depending on the aberration of the third lens. As the second unit's contribution to the correction of aberration varies very much depending on the height of the object, a strong bending of aberration such as distortion is caused in this case.

Since, as previously described, the refractive power of the third lens unit can be weakened as much as possible within a broad allowable range, the load applied for aberration correction can be reduced accordingly. Therefore, as shown later in the first embodiment of the invention, the third lens unit may be composed of a positive lens only. The construction of the third lens unit comprising only one lens component is significant for the simplification of the construction of the whole projection objective lens. In addition, it is very advantageous for diminishing the flare effect in the case of reflection illumination.

As to the refractive power of the second lens unit, it is essential to satisfy the above condition (3).

When the refractive power is under the lower limit of the condition (3), it is no longer possible to obtain the second lens unit which is simple in construction and has the above-mentioned functions. On the contrary, if it exceeds the upper limit of the condition (3), the size of the lens will be made too large in the direction along the optical axis.

As for the position of the diaphragm, it is most desirable, as seen from the foregoing, to position the diaphragm in the vicinity of the first lens unit, more preferably at a position near the first lens on the side facing the second lens unit. This diaphragm position is desirable for the fact that the load of aberration correction applied to the first lens unit is relatively small and the allotment of functions to the respective lens units can be made as desired.

The term "diaphragm" as used herein means not only a particular member provided to limit a beam of light but also a lens tube per se or a lens-supporting ring which may function as a diaphragm. In precise sense, the substantial diaphragm position used herein is defined as the position at which the principal ray of the oblique beam intersects the optical axis.

When the diaphragm is positioned a little behind the first lens unit and the first and second lens units are arranged approximately symmetrically about the diaphragm as shown in the first embodiment later, coma can be corrected well.

In a preferred embodiment of the invention, the image side surface of the first lens unit is highly convexed toward the image side for the purpose of correction of spherical aberration. For the purpose of correction of coma, the object side surface of the second lens unit is preferably formed as a surface convexed toward the object side.

When the second lens unit is constituted of a cemented meniscus lens, it is also preferable, as a matter of course, that the image side surface also be convexed toward the object side.

The third lens unit is preferably composed of a single positive lens. This construction is very effective to diminish the flare effect during reflection illumination. However, some aberration remains in it. When the second lens unit is formed as a cemented meniscus lens, therefore, it is desirable to design the cemented meniscus lens taking the remaining aberration into account. In a preferred form, the cemented meniscus lens satisfies the following condition:

$$n_{21} > n_{22}$$

wherein,
$n_{21}$ is the refractive index of the negative lens component on the image side of the cemented meniscus lens and $n_{22}$ is the refractive index of the positive lens component on the object side of the cemented meniscus lens.

In this second lens unit, the cemented surface functions as a diverging surface and better correction of aberrations, mainly distortion can be assured by it.

As readily understood from the foregoing, the projection objective lens according to the present invention has many advantages over the prior art ones.

In the lens of the invention, the respective lens units have their definite functions. The allotment of refractive power to the respective lens units is optimum for a projection objective lens. The construction is simple and compact. As compared with the prior art ones, the aberrations in the lens have been improved to a great extent for a less number of lens components needed. It is also possible by the present invention to obtain a larger angle of field.

The present invention will hereinafter be described by its preferred embodiments with reference to the accompanying drawings.

BRIEF DESCRIPTION OF THE DRAWINGS

FIG. 3 is a similar view showing a third embodiment of the invention.

DESCRIPTION OF PREFERRED EMBODIMENTS

Figure 1:
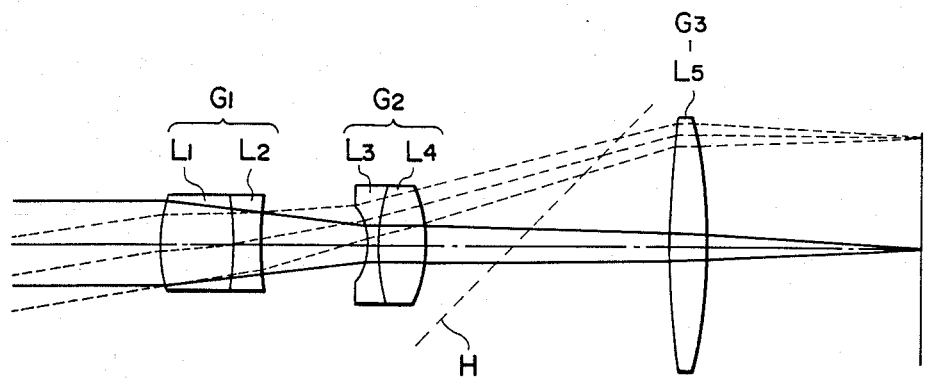
FIG. 1 schematically shows the construction of a first embodiment of the low magnification projection objective lens according to the present invention.

The first embodiment shown in FIG. 1 is a projection objective lens having the most basic construction according to the present invention.

Looking from the image side, the lens comprises a converging first lens unit G1, a diverging second lens unit G2 and a converging third lens unit G3.

The first lens unit G1 is composed of a convexo-convex positive lens $L_1$ and a concavo-convex negative $L_2$ cemented to the positive lens at the object side thereof. The second lens unit G2 is composed of a concavo-convex negative lens $L_3$ and a convexo-convex positive lens $L_4$ cemented to the negative lens at the object side thereof. The third lens unit G3 is composed of a single positive lens $L_5$.

In FIG. 1, the travelling course of rays from an object point on axis is indicated by solid line and that of rays from an off-axial object point is indicated by broken line. The following table 1 shows data of the first embodiment.

The number in the first column is the ordinal number from the image side. Refractive index and Abbe's number are values measured to d-ray ($\lambda=587.6$ nm). $d_o$ represents the distance from the image plane to the apex of the most-image side lens surface.

TABLE 1
(First Embodiment)

magnification: × 5  
F-number: 8.5  
focal length: f = 198.04  
working distance: 57.67  
$d_o$: 999.876

| No | radius of curvature r | thickness · distance on-axis d | refractive index n | Abbe's number ν | |
|----|------|------|------|------|----|
| 1 | 39.267 | 20.5 | 1.6935 | 53.8 | |
| 2 | −75.766 | 7.35 | 1.7495 | 35.2 | G1 |
| 3 | 101.875 | 23.0 | | | |
| 4 | −21.723 | 3.9 | 1.7495 | 35.2 | |
| 5 | 69.467 | 12.55 | 1.58267 | 46.5 | G2 |
| 6 | −37.155 | 66.05 | | | |
| 7 | 202.527 | 10.0 | 1.80454 | 39.6 | G3 |
| 8 | −175.216 | | | | |

$f_1 = 84.58$   $D_2/f_3 = 0.56$
$f_2 = -64.15$   $f_3/f = 0.6$
$f_3 = 118.16$   $|f_2|/f = 0.32$

Figure 2:
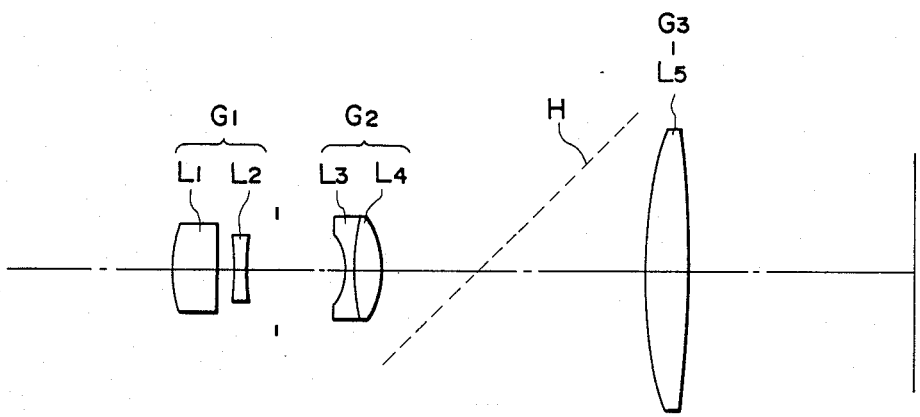
FIG. 2 is a similar view showing a second embodiment of the invention.

The second embodiment shown in FIG. 2 is different from the above first embodiment in the point that the positive lens $L_1$ and the negative lens $L_2$ of the first lens unit G1 are spaced from each other to increase the freedom for aberration correction as well as to obtain a larger angle of field.

The following table 2 shows data of the second embodiment.

The number in the first column is the ordinal number from the image side. Refractive index and Abbe's number are values measured to d-ray ($\lambda=587.6$ nm). $d_o$ represents the distance from the image plane to the apex of the most-image side lens surface.

TABLE 2
(Second Embodiment)

magnification: × 5  
focal length: f = 192.47  
working distance: 57.72

TABLE 2-continued
(Second Embodiment)

F-number: 8.5   $d_o$: 999.0

| No | radius of curvature r | thickness · distance on axis d | refractive index n | Abbe's number ν | |
|----|------|------|------|------|----|
| 1 | 37.772 | 16.76 | 1.6968 | 55.6 | |
| 2 | −117.436 | 2.42 | | | G1 |
| 3 | −87.733 | 3.0 | 1.75692 | 31.7 | |
| 4 | 93.829 | 32.15 | | | |
| 5 | −20.93 | 4.85 | 1.744 | 45.1 | |
| 6 | 173.87 | 8.45 | 1.56384 | 60.8 | G2 |
| 7 | −30.75 | 66.5 | | | |
| 8 | 139.5 | 10.0 | 1.79631 | 41.0 | G3 |
| 9 | −376.959 | | | | |

$f_1 = 92.43$   $D_2/f_3 = 0.52$
$f_2 = -77.5$   $f_3/f = 0.67$
$f_3 = 129.0$   $|f_2|/f = 0.40$

The third embodiment shown in FIG. 3 is different from the above second embodiment in the point that the most-image side convexo-convex positive lens $L_1$ is formed as a cemented lens to further improve chromatic aberrations.

The following table 3 shows data of the second embodiment.

The number in the first column is the ordinal number from the image side. Refractive index and Abbe's number are values measured to d-ray ($\lambda=587.6$ nm). $d_o$ represents the distance from the image plane to the apex of the most-image side lens surface.

TABLE 3
(Third Embodiment)

magnification: × 5  
F-number: 8.5  
focal length: f = 192.55  
working distance: 56.87  
$d_o$: 999.0

| No | radius of curvature r | thickness · distance on axis d | refractive index n | Abbe's number ν | |
|----|------|------|------|------|----|
| 1 | 35.78 | 10.87 | 1.6935 | 53.76 | |
| 2 | −69.619 | 4.3 | 1.74443 | 49.46 | G1 |
| 3 | −112.636 | 2.55 | | | |
| 4 | −88.472 | 2.7 | 1.75692 | 31.7 | |
| 5 | 87.191 | 30.35 | | | |
| 6 | −20.0 | 2.3 | 1.744 | 45.1 | |
| 7 | 157.302 | 9.4 | 1.56384 | 60.8 | G2 |
| 8 | −28.811 | 71.25 | | | |
| 9 | 136.414 | 10.0 | 1.79631 | 41.0 | G3 |
| 10 | −422.246 | | | | |

$f_1 = 89.07$   $D_2/f_3 = 0.55$
$f_2 = -74.9$   $f_3/f = 0.68$
$f_3 = 130.5$   $|f_2|/f = 0.39$

As described above, the present invention has provided a low magnification projection objective lens which is simple in construction and exhibits improved image-forming performance while maintaining the telecentricity. When the lens is used in a projection examination instrument, it enables to examine a broader area of the object and measure it with very high accuracy. In the projection objective lens according to the invention, the problem of flare effect during reflection illumination is minimized. Through the projection objective lens, man can clearly observe even the contour of such an object having a low reflectance which has been difficult to observe through the prior art lens.

I claim:

1. A low magnification projection objective lens comprising, arranged in the named order from the image plane,:
   a converging first lens unit composed of a first positive lens component on the image side and a first negative lens component on the object side;
   a diverging second lens unit composed of a second negative lens component on the image side and a second positive lens component on the object side;
   a converging third lens unit composed of a third positive lens component; and
   a half-mirror for illumination obliquely disposed between said second and third lens units.

2. A low magnification projection objective lens according to claim 1, wherein the image side surface of said first lens unit is convexed toward the image side, the object side surface of said second lens unit is convexed toward the object side and said third lens unit is constituted of a positive single lens.

3. A low magnification projection objective lens according to claim 2, wherein said second lens unit is constituted of a cemented meniscus lens formed by cementing a negative concavo-concave lens and a positive convexo-convex lens together and said concavo-concave lens has a higher refractive index than said convexo-convex lens does.

4. A low magnification projection objective lens comprising, from the image side,:
   a converging first lens unit composed of a positive lens component and a negative lens component disposed on the object of said positive component;
   a diverging second lens unit composed of a negative lens component and a positive lens component disposed on the object side of said negative component; and
   a converging third lens unit; and satisfying the conditions of:

$$0.45 < D_2/f_3 < 0.65 \quad (1)$$

$$0.5 < f_3/f < 0.8 \quad (2)$$

$$0.2 < |f_2|/f < 0.45 \quad (3)$$

wherein,
f is the focal length of the whole projection objective lens;
$f_2$ is the focal length of the second lens unit G2;
$f_3$ is the focal length of the third lens unit G3;
$D_2$ is air distance between the second and third lens units.

5. A low magnification projection objective lens according to claim 4, wherein said second lens unit is constituted of a cemented meniscus lens formed by cementing a negative lens on the image side and a positive lens on the object side together and the refractive index of said negative lens is larger than that of said positive lens so that the cemented surface between the two lenses is formed as a diverging surface and wherein said third lens unit is constituted of a single lens of positive power.

6. A low magnification projection objective lens according to claim 4, which is characterized by the following data:

| | focal length: f = 198.04 |
|---|---|
| magnification: × 5 | working distance: 57.67 |
| F-number: 8.5 | $d_0$: 999.876 |

| No | radius of curvature r | thickness · distance on axis d | index n | number ν | |
|---|---|---|---|---|---|
| 1 | 39.267 | 20.5 | 1.6935 | 53.8 | |
| 2 | −75.766 | 7.35 | 1.7495 | 35.2 | G1 |
| 3 | 101.875 | 23.0 | | | |
| 4 | −21.723 | 3.9 | 1.7495 | 35.2 | |
| 5 | 69.467 | 12.55 | 1.58267 | 46.5 | G2 |
| 6 | −37.155 | 66.05 | | | |
| 7 | 202.527 | 10.0 | 1.80454 | 39.6 | |
| 8 | −175.216 | | | | G3 |

| $f_1 = 84.58$ | $D_2/f_3 = 0.56$ |
|---|---|
| $f_2 = -64.15$ | $f_3/f = 0.6$ |
| $f_3 = 118.16$ | $|f_2|/f = 0.32$ | wherein, the number in the first column is the ordinal number of the lens surface looking from the image side and G1, G2, G3 in the last column are the numbers of the respective lens units.

7. A low magnification projection objective lens according to claim 4, which is characterized by the following data:

| | focal length: f = 192.47 |
|---|---|
| magnification: × 5 | working distance: 57.72 |
| F-number: 8.5 | $d_0$: 999.0 |

| No | radius of curvature r | thickness · distance on-axis d | refractive index n | Abbe's number ν | |
|---|---|---|---|---|---|
| 1 | 37.772 | 16.76 | 1.6968 | 55.6 | |
| 2 | −117.436 | 2.42 | | | G1 |
| 3 | −87.733 | 3.0 | 1.75692 | 31.7 | |
| 4 | 93.829 | 32.15 | | | |
| 5 | −20.93 | 4.85 | 1.744 | 45.1 | |
| 6 | 173.87 | 8.45 | 1.56384 | 60.8 | G2 |
| 7 | −30.75 | 66.5 | | | |
| 8 | 139.5 | 10.0 | 1.79631 | 41.0 | G3 |
| 9 | −376.959 | | | | |

| $f_1 = 92.43$ | $D_2/f_3 = 0.52$ |
|---|---|
| $f_2 = -77.5$ | $f_3/f = 0.67$ |
| $f_3 = 129.0$ | $|f_2|/f = 0.40$ | wherein, the number in the first column is the ordinal number of the lens surface looking from the image side and G1, G2, G3 in the last column are the numbers of the respective lens units.

8. A low magnification projection objective lens according to claim 4, which is characterized by the following data:

| | focal length: f = 192.55 |
|---|---|
| magnification: × 5 | working distance: 56.87 |
| F-number: 8.5 | $d_0$: 999.0 |

| No | radius of curvature r | thickness · distance on-axis d | refractive index n | Abbe's number ν | |
|---|---|---|---|---|---|
| 1 | 35.78 | 10.87 | 1.6935 | 53.76 | |
| 2 | −69.619 | 4.3 | 1.74443 | 49.46 | G1 |
| 3 | −112.636 | 2.55 | | | |
| 4 | −88.472 | 2.7 | 1.75692 | 31.7 | |
| 5 | 87.191 | 30.35 | | | |
| 6 | −20.0 | 2.3 | 1.744 | 45.1 | |
| 7 | 157.302 | 9.4 | 1.56384 | 60.8 | G2 |
| 8 | −28.811 | 71.25 | | | |
| 9 | 136.414 | 10.0 | 1.79631 | 41.0 | G3 |
| 10 | −422.246 | | | | |

| $f_1 = 89.07$ | $D_2/f_3 = 0.55$ |
|---|---|
| $f_2 = -74.9$ | $f_3/f = 0.68$ |
| $f_3 = 130.5$ | $|f_2|/f = 0.39$ | wherein, the number in the first column is the ordinal number of the lens surface looking from the image side and G1, G2, G3 in the last column are the numbers of the respective lens units.

* * * * *